(12) United States Patent
Foisy

(10) Patent No.: US 8,077,027 B2
(45) Date of Patent: Dec. 13, 2011

(54) SYSTEM AND METHOD FOR ANALYZING FAULTY EVENT TRANSMISSIONS

(75) Inventor: Stephane Foisy, Udora (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 385 days.

(21) Appl. No.: 12/394,738

(22) Filed: Feb. 27, 2009

(65) Prior Publication Data

US 2010/0219970 A1 Sep. 2, 2010

(51) Int. Cl.
*G08B 19/00* (2006.01)

(52) U.S. Cl. ............... 340/521; 340/538.11; 340/539.22

(58) Field of Classification Search .................. 340/521, 340/531, 605, 606, 616, 618, 533, 534, 525, 340/538.11, 538.15, 539.1, 539.21, 539.22
See application file for complete search history.

(56) References Cited

U.S. PATENT DOCUMENTS

| | | | |
|---|---|---|---|
| 6,124,806 A * | 9/2000 | Cunningham et al. | 340/870.2 |
| 6,658,091 B1 | 12/2003 | Naidoo et al. | |
| 6,968,294 B2 * | 11/2005 | Gutta et al. | 702/188 |
| 7,057,507 B1 * | 6/2006 | Sandifer | 340/531 |
| 7,120,233 B2 * | 10/2006 | Naidoo et al. | 379/37 |
| 7,131,136 B2 * | 10/2006 | Monroe | 725/105 |

FOREIGN PATENT DOCUMENTS

WO  WO 01/52478 A2  7/2001

\* cited by examiner

*Primary Examiner* — Daniel Previl
(74) *Attorney, Agent, or Firm* — Kacvinsky Daisak PLLC

(57) ABSTRACT

A system and method are disclosed for recording and evaluating faults in event transmissions between security system components. A panel in a monitored building may send event signals to a receiver located in a central monitoring facility. Event signals may represent a status of individual alarms or sensors in the building, or they may provide a status of the system as a whole. If the quality of the transmission is substandard or in a format that is unacceptable to the receiver, the signal data associated with the event is recorded for analysis. Recording is controlled by a line card associated with the receiver, and the signal data is stored in local or remote memory. Signal data can be manually or automatically analyzed to determine the source of the fault. In addition, recorded signal data can be used to build customized software to recognize signals from previously unrecognized or faulty panels.

25 Claims, 2 Drawing Sheets

SYSTEM AND METHOD FOR ANALYZING FAULTY EVENT TRANSMISSIONS

FIELD OF THE INVENTION

Embodiments of the invention relate to the field of fault detection for security system event transmissions. More particularly, embodiments of the invention relate to a system and method for recording and evaluating faults in event transmissions between security system components.

DISCUSSION OF RELATED ART

Typical building alarm systems often include a number of notification appliances positioned throughout a building to alert occupants of fire and non-fire emergencies. These notification appliances may include smoke detectors, fire alarms, security alarms, emergency lighting, strobe lighting, and the like. In addition to these notification appliances, building alarm systems may include components, such as a Digital Alarm Communicator Transmitter (DACT), that provide a communications link between the building in which the alarm system is located and a receiver in a central monitoring facility that is geographically remote from the building. The communications link may allow event transmissions to flow between the building alarm system and the central monitoring facility. These event transmissions may provide information about the status of the alarm system (e.g., that it is operational, that it has been armed, that it has been disarmed), or they may provide information about the status of one or more alarms or sensors in the building (e.g., that a window or door has been opened or that a smoke or fire detector is experiencing an alarm condition).

During regular event transmissions from a DACT to the central monitoring facility there are sometimes instances in which the transmission is not successful, either because the quality of the transmission is substandard or because the information is not transmitted in a format that is acceptable to the receiver. These instances can range in root cause and can prove difficult to ascertain as to whether they constitute "one off" problems or whether they constitute failures requiring systematic troubleshooting.

Finding the root cause often requires an in-depth review of the transmission signal. Current systems, however, do not automatically record faulty event transmission signals. Rather, they typically only notify an operator that a faulty transmission has occurred on a particular line, but by that time the event has passed. Thus, to troubleshoot the fault, recording devices must be added to the telephone line to capture the "next" occurrence of a faulty transmission signal on that line. Once the "next" faulty transmission signal is recorded, a person must manually review the signal details to diagnose the problem.

The current manual review process is often plagued by problems such as poor recording, lack of precisely calibrated equipment, unknown time frame of the fault recording, and the like. In addition, the add-on recording equipment may record large volumes of signal data while waiting for the "next" fault to occur on the line. Further, since the add-on recording equipment may not be time-stamped in perfect sync with the system receiver, it can be time consuming for the reviewer to locate the recorded faulty signal data. This slows the review process and, thus, slows final resolution of the problem.

Moreover, adding recording equipment to the phone line in parallel or series with the receiver can affect the signal, thus hindering effective analysis of the signal once it is recorded. In addition, since the added equipment typically records the signal upstream of the receiver, such an arrangement can fail to detect signal problems caused by the receiver. Thus, if the ultimate problem resides in the manner in which the receiver is processing the signal, such a problem will not be detected with current systems.

There is a need for an improved system for efficiently detecting and diagnosing failures in signals transmitted between on-site security systems and a central monitoring facility. The system should be automated and should eliminate the deficiencies associated with prior art analysis techniques.

SUMMARY OF THE INVENTION

The disclosed system increases the efficiency of detecting and diagnosing fault conditions associated with communications between alarm system sites and central monitoring facilities. In addition to detecting problems with panels and communications links, the system can also detect whether conditions within the central monitoring facility's receiver are causing or contributing to the fault. Recorded fault data is fully indexed in memory associated with the receiver or a connected device, thus enabling quick location of the data for review.

A method is disclosed for identifying event transmissions. The method may comprise at a receiver at a second location, receiving event signal data from a panel at a first location; processing the event signal data at the receiver; recording the event signal data in memory associated with the receiver; determining whether the event signal data conforms to a predefined parameter or protocol; identifying the recorded event signal data as data to be overwritten if the event signal conforms to the predefined parameter or protocol; and identifying the recorded event signal data as data to be saved if the event signal does not conform to the predefined parameter or protocol. The method may further comprise providing an indication that recorded event signal data is available for review.

A system is disclosed for identifying faulty event transmissions. The system may be used with a system comprising a plurality of alarms and an alarm panel associated with a monitored building, a receiver associated with a central monitoring facility, and a machine-readable storage medium. The machine-readable storage medium may be encoded with a computer program code such that, when the computer program code is executed by a processor, the processor performs a method comprising at receiving, at the receiver, event signal data from the alarm panel; processing the event signal data at the receiver; recording the event signal data in memory associated with the receiver; determining whether the event signal data conforms to a predefined parameter or protocol; identifying the recorded event signal data as data to be overwritten if the event signal conforms to the predefined parameter or protocol; and identifying the recorded event signal data as data to be saved if the event signal does not conform to the predefined parameter or protocol. The method may further comprise providing an indication that recorded event signal data is available for review.

DESCRIPTION OF EMBODIMENTS

Figure 1:
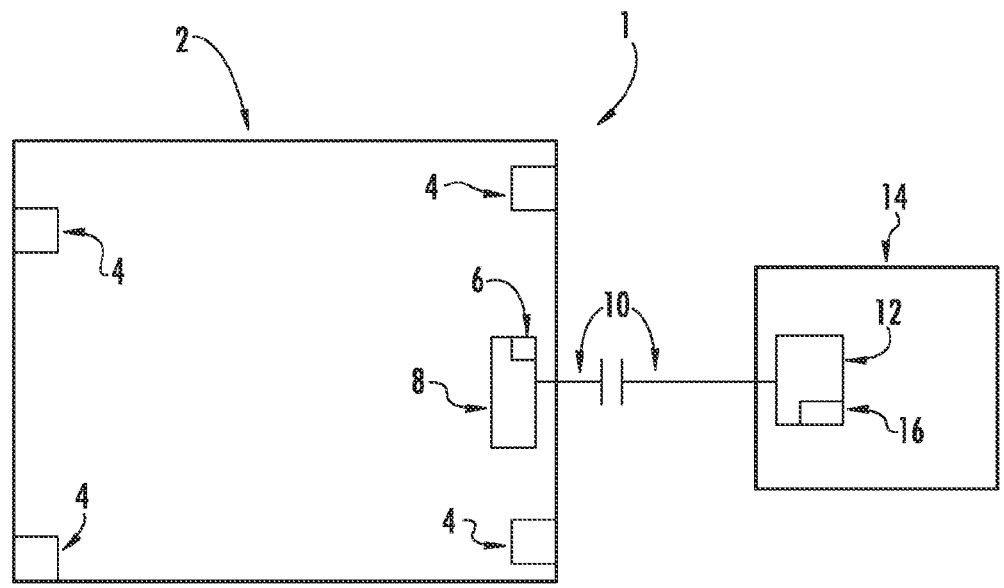
FIG. 1 is a schematic of the disclosed system.

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to FIG. 1, a system 1 is shown for providing remote monitoring of a commercial or residential building 2. The system 1 may include a plurality of sensors 4 positioned throughout the building, and a Digital Alarm Communicator Transmitter (DACT) 6 housed within a security system panel 8. The DACT 6 may be in communication with the plurality of sensors 4 to receive signals therefrom. The connections between the DACT and some or all of the sensors can be hard wire connections or they may be wireless connections. A communication link 10 may be provided between the panel 8 and a receiver 12 located at a central monitoring facility 14. The receiver 12 may have one or more line cards 16 equipped to receive and process signals transmitted from the panel 8. The line cards 16 may also be equipped to send signals to the panel 8 via the communication link 10. Typically the central monitoring facility 14 is geographically remote from the building 1 being monitored, and in practical application the central monitoring facility 14 will monitor signals received from a plurality of different buildings.

The communication link 10 between the panel 8 and the receiver 12 may be any of a variety of analog or digital communications forms. Thus, the communications link may be an analog phone line or it may be a digital transmission line. In addition, a portion or all of the communications link may be a hard wired or wireless connection. A non-limiting list of exemplary technologies making up the communication link includes analog or digital phone lines, fiber optic lines, T1 or T2 lines, public/private networks, wireless (Radio Frequency (RF)), cellular and/or satellite connections. In addition, a portion of the communication link 10 may be a public or private network.

Figure 2:
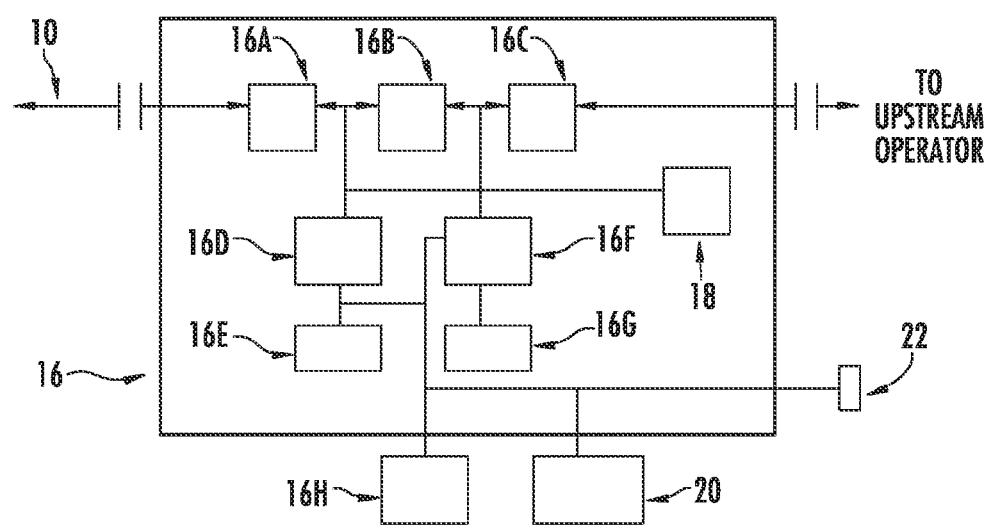
FIG. 2 is a schematic of an exemplary line card for use in a receiver of the system of FIG. 1.

As noted, the receiver 12 may include one or more line cards 16 equipped to receive and process the incoming signals from the panel 8. As will be appreciated, the nature of the signal (analog vs. digital) is not critical to the disclosed system, and any of a variety of input signals may be received and processed by the line card 16. Depending on the nature of the input signal, however, the line card 16 may include a variety of filtering, amplifying and processing (e.g., digital signal processor (DSP)) components. An exemplary line card 16 is shown in FIG. 2, and includes public switched telephone network (PSTN) line circuitry 16A, DSP circuitry 16B, processor signal decoding circuitry 16C, analog recording circuitry 16D and associated local memory 16E, raw data debug circuitry 16F and associated memory 16G, and external memory 16H.

In practical application, the central monitoring facility 14 has a plurality of receivers 12, each of which is configured to accept a plurality of inputs from panels 8 located in a plurality of different monitored buildings.

Each line card 16 may be programmed to recognize a variety of different predetermined input signals transmitted from associated panels, and to take certain actions based on those signals. As previously noted, the input signals may represent a variety of alarm system "events," such as the status of the alarm system itself (e.g., that it is operational, that it has been armed, that it has been disarmed), the status of one or more individual alarms or sensors in the monitored building 1 (e.g., that a window or door has been opened or that a smoke or fire detector is experiencing an alarm condition). The panel 8 may also send periodic signals to the receiver 12 to "check in," confirming that the panel is functioning and/or updating the panel's clock to sync with that of the receiver 12.

In one embodiment, the line card 16 within the receiver 12 detects a ring from a monitored panel 8 and begins recording event signal data in local memory 16E, 16G. The line card 16 may process the event signal data to determine if the signal complies with a set of predefined parameters (or protocols). This can be done using any of a variety of known methods. For example, most pulse and dual-tone multi frequency (DTMF) formats require that the panel 8 transmit the same data twice. The receiver 12 then matches the twice transmitted data to confirm they are valid. Another technique is referred to as a checksum calculation in which the last digit transmitted by the panel 8 is a mathematical calculation of the previous digits. If the receiver 12 calculates the same digit, then the transmission is acceptable.

If the signal is recognized, then the line card 16 may produce a return signal to the panel 8 (often referred to as a "kiss-off") to inform the panel 8 that the signal was received and recognized, and instructing the panel either to cease sending signals or to send a next set of event signals.

If the line card 16 produces a kiss-off signal to the panel 8 signifying a successful transmission (i.e., one that is fully recognized by the line card 16), then the event signal data that was recorded in local memory 16E, 16G will be overwritten when further event signals are received and recorded by the line card 16.

If, however, the line card 16 does not recognize the event signal due to some fault in the transmission and/or associated equipment, then the line card 16 will not produce a kiss-off. If no such kiss-off or positive acknowledgement is produced, the line card 16 will flag the recorded data along with any associated debug information, time stamp, caller ID, and/or raw error codes that were produced with the faulty event signal data. The flag will ensure that the event data will not be overwritten in the local memory 16E, 16G when further event signals are received and recorded by the line card 16.

When a faulty event signal is received, the line card 16 may also provide an indication (e.g., alert e-mail, audible sound or message, LED indicator) to a system operator to notify the operator that a suspect signal is available for review. The alert message may indicate to the operator that a certain line has received a faulty call, and that data exists in the local memory for review. The operator may review the call data immediately to perform basic diagnostics (e.g., to determine if the fault is simply due to a customer or user misdialing the telephone,). The call data stored in the local memory 16E, 16G may also be reviewed periodically by a shift supervisor or other personnel at the central monitoring facility 14. It will be appreciated that the step of alerting the operator is optional, because the system will automatically record the incoming signals and the user can simply review the logs periodically to diagnose the faulty signals.

As previously noted, the system 1 may eliminate deficiencies in previous systems attributable to the placement of additional tapping equipment on the affected phone line. In addition, the recorded data will provide the reviewer with detailed information about the signal upstream and downstream of the digital signal processor (DSP) and other line card components to enable an application level debug of the faulty signal.

Referring again to FIG. 2, an exemplary line card 16 will be described in greater detail. As shown, the line card 16 may comprise a PSTN line circuit 16A for accepting an incoming analog call signal from a panel 8. The received analog call signal may be converted to a digital signal via one or more DSPs 16B, and then routed through processor signal decoding circuitry 16C, before being passed on to an operator. An analog recording circuit 16D may tap the signal at a location between the PSTN line circuit 16A and the DSP 16B. The analog recording circuit 16D may have a local memory 16E and/or external memory 16H for storing the analog signal data. Raw digital data debug circuitry 16F may tap the signal at a location between the DSP 16B and the processor signal decoding circuitry 16C. The debug circuitry 16F may have a local memory 16G and/or external memory 16H for storing digital signal data and/or debug data. The debug circuitry 16F may also capture signal data downstream of the analog recording circuit 16D.

Thus, with the disclosed arrangement, a wide variety of data may be recorded for analysis, including the raw analog audio signal, the raw digital conversion of the signal performed by the DSP 16B, Caller ID, automatic number identification (ANI) and/or dialed number information service (DNIS), date and time of the call, line card profile (i.e., the parameters of the programming of the card), version of the firmware for individual card components (DSP, controller, etc.), as well as a perceived reason for the failure. The disclosed arrangement provides the user with a substantial variety of data from which to select when performing a signal fault analysis.

A microcontroller 18 associated with the line card 16 may be connected to the line card components 16A-H in a desired manner. The microcontroller 18 may be programmed to verify a variety of signal parameters or protocols to accurately determine where the defect in the data is being generated, thus enabling the user to determine why the signal was rejected. Thus, the microcontroller 18 may be programmed to analyze a variety of parameters or protocols, such as whether the receiver "heard" the signal from the panel (which could represent a call hang up or a weak signal), whether a checksum was wrong, whether the signal was a fax or wrong number, or whether the receiver simply did not "understand" the data (i.e., the receiver expected a particular format due to the handshake but instead received a format that it did not understand). This information can then be used to determine if the fault occurred in any of the system equipment (e.g., faulty panel, faulty transmission line, faulty receiver equipment).

The microcontroller 18 may perform other checks as well. For example, if the transmitted data is in a DTMF format, the microcontroller may calculate and confirm one or more checksums. The microcontroller may also check to ensure that the frequency shift keying (FSK) resides within the correct frequencies. The microcontroller 18 further may check to ensure that the panel 8 does not continue to duplicate a faulty signal when that signal is unrecognized by the receiver.

In addition to, or in lieu of, providing an automated or semi-automated analysis of fault data, the system 1 may record the audio data (e.g., in .wav or other appropriate format). This recorded audio data may be sent through a test receiver for debugging. This may also be done to ensure that an implemented fix has appropriately addressed, and that future signals are being correctly received.

In addition to its use in identifying the source of faulty event signal data, the system 1 may also be configured to accept less than perfect signals from one or more panels 8. In one embodiment, a characteristic of the receiver 12 may be adjusted to accommodate the less than perfect signals. This may be advantageous in situations in which it is impractical or uneconomical to fix or adjust a remotely-located panel. In such instances, the software controlling the line card 16 may be adjusted slightly to accept the signals generated by the particular panel 8, thus eliminating the need to fix the panel. This fix may be implemented in any instance in which the receiver "hears" the signal. A non-limiting example in which this may be appropriate is where the customer has set the line sensitivity too low, thus making the line card 16 effectively "deaf" to the panel 8 signal. Widening the sensitivity of the receiver 12 may thus allow an otherwise too-weak signal to be received.

This technique may also enable the operator of the central monitoring facility 14 to create line card software that will accommodate a library of unique, old, or normally unrecognized panels, thus providing a high degree of flexibility to the system 1. In some instances, a customer may have a panel that is capable of transmitting event data to the receiver 12, but the format of the event data may not be recognized by the receiver 12. Typically this would result in the generation of an error, and the non-compatibility would be confirmed using one or more of the aforementioned diagnostic techniques. With the disclosed system, the user can then place the receiver 12 in a "receive all" mode. Personnel at the central monitoring facility 14 may then request the panel-user to transmit a variety of predetermined event signals from the panel 8 to the receiver 12. By knowing what particular "event" each of the event signals represents, code can be developed to accommodate that panel, thus resulting in a customized adaptation for that particular customer. For this embodiment, the panel 8 would simply need to be able to respond to a handshake produced by the receiver 12 to initiate the data transmission. As noted, this may be an advantage where it is undesirable or impractical to fix an existing panel or to require the user to obtain a new panel.

Alternatively, the line card software may be adjusted to create complex tones to initiate an individual panel's transmission. This could be "new" (beta) software that the specific customer could utilize. In the worst case (i.e., where the receiver hears the signal but does not recognize the signal format) the raw audio file still can be used to dissect the signal to enable communication.

In one embodiment, the line card 16 may have sufficient local memory 16E, 16G to store 10-24 signals before being overwritten. In one embodiment, the local memory 16E, 16G comprises nonvolatile random access memory (RAM). Alternatively, one or both local memories 16E, 16G may be a small on-board hard disk drive. In an alternative embodiment, the receiver line card 16 may includes a direct output to a computer 20 so that when a ring is detected the line card 16 instructs the computer 20 to begin recording. The remaining steps would be the same as previously noted. This technique may allow the receiver 8 to leverage the much larger memory capacity of the computer's hard drive, as compared to the local memory (i.e., buffer) 16E, 16G of the line card 16. The interface to the computer 20 can be via ethernet, audio cable, USB connection, serial port, wireless, or the like.

In another embodiment, the line card 16 may interface with a USB flash drive 22. The audio recording and associated data may be loaded onto the flash drive 22, allowing the user to directly collect the data via the USB drive for remote diagnostic analysis.

In a further embodiment, the line card 16 may direct that all audio and other data for all events received from the panel 8 be stored in external memory 16H, 20 to preserve a history of all of the daily event traffic. A memory index may be created to enable the user to quickly locate faulty call data for review. The index may contain time stamp and other appropriate index marker(s) may also be placed in the index. Additional information that can be stored in the index includes Caller-ID, ANI, and DNIS for the call.

The system 1 may also function to record two-way audio calls that are passed through the receiver 12. In some instances, a panel 8 will open an audio line with the receiver 12 subsequent to transmission of certain event data. This may enable a person located in the monitored building 2 to speak to a person at the central monitoring facility 14, for example, to verify an alarm condition received by the receiver 12. A microphone and transmitter may be provided at the building 2 and the central monitoring facility 14 so the parties can engage in verbal communication (e.g., to convey details of a patient emergency, or to record audio of a burglary in the monitored building).

Figure 3:
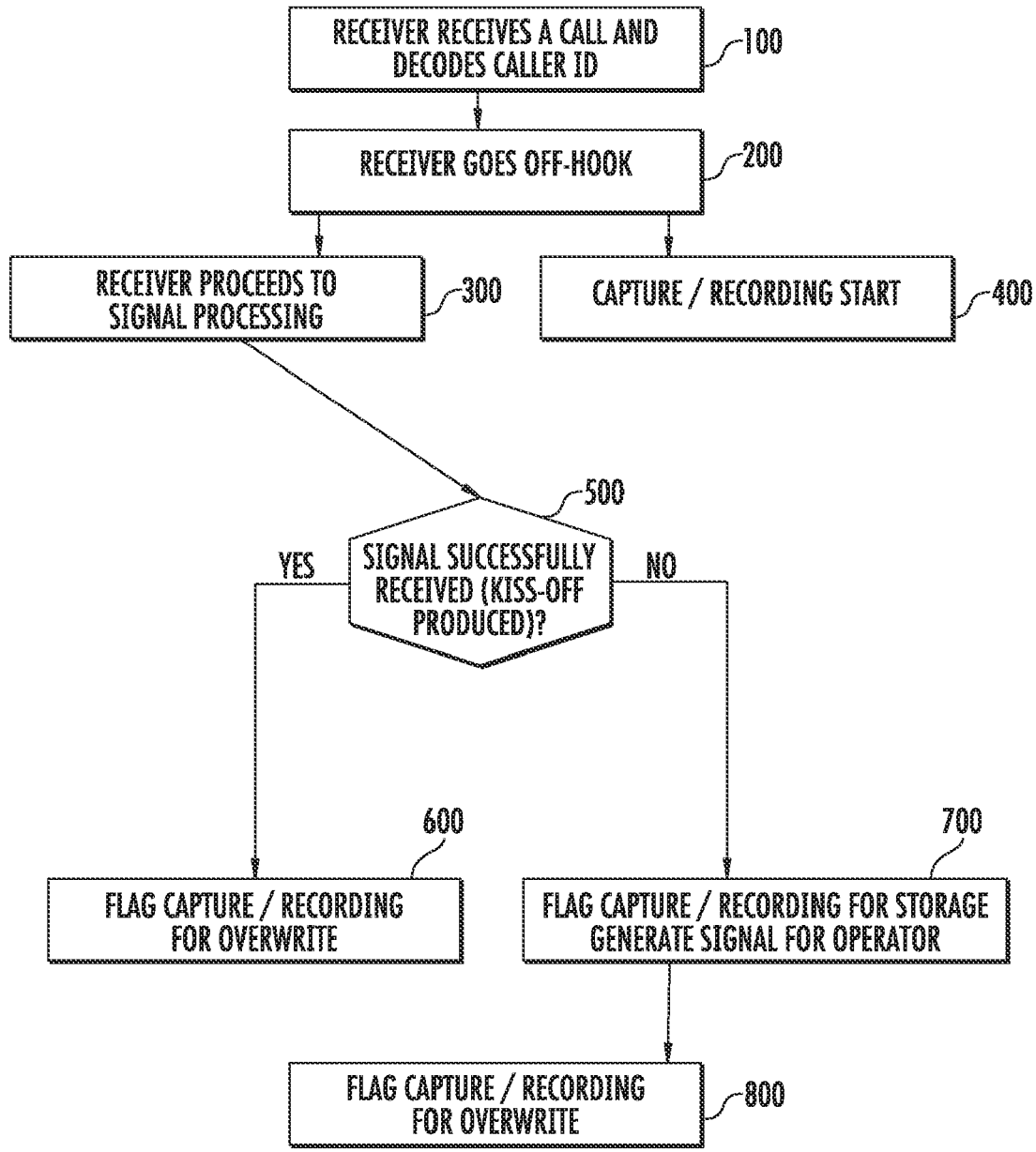
FIG. 3 is a flowchart describing an exemplary method of operating the system of FIG. 1.

Referring to FIG. 3, a method of operating the system 1 will now be described. At step 100, the receiver 12 receives a call from a monitored panel 8 and decodes the caller ID of the panel 8. At step 200, the receiver 12 goes off-hook. At step 300 the receiver 12 proceeds to process the event signal, while at step 400 the receiver concurrently begins to record event data. At step 500 the receiver 12 determines whether the event signal has been successfully received (i.e., whether a kiss-off was produced). If the signal was successfully received, then at step 600 the captured recording is flagged to be overwritten during subsequent recording. If the signal was not successfully received, then at step 700 the captured recording is flagged for storage (i.e., so that it will not be overwritten), and an indication is generated which, in one embodiment, is a notification to an operator that a recording is available for review and analysis. Once the captured recording has been analyzed or copied to another storage media for analysis, then at step 800 the recording is flagged to be overwritten during subsequent recording.

The functions and process steps herein may be performed automatically or wholly or partially in response to user command. An activity (including a step) performed automatically is performed in response to executable instruction or device operation without user direct initiation of the activity.

The systems and processes of FIGS. 1-3 are not exclusive, Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIGS. 1 and 2. Further, any of the functions and steps provided in FIG. 3 may be implemented in hardware, software or a combination of both and may reside on one or more processing devices located at any location of a network linking the elements of FIGS. 1 and 2 or another linked network, including the Internet.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof,

What is claimed is:

1. A method for identifying event transmissions, comprising:
    at a receiver at a second location, receiving event signal data from a panel at a first location;
    processing the event signal data at the receiver;
    recording the event signal data in memory associated with the receiver;
    determining whether the event signal data conforms to a predefined parameter or protocol;
    identifying the recorded event signal data as data to be overwritten if the event signal is recognized by the receiver;
    identifying the recorded event signal data as data to be saved if the event signal is not recognized by the receiver.

2. The method of claim 1, further comprising the step of providing an indication that recorded event signal data is available for review.

3. The method of claim 2, wherein the indication comprises an alert sent to a system operator.

4. The method of claim 1, wherein the first location is a monitored building, and the event signal data is representative of an alarm condition sensed by at least one sensor located within the monitored building.

5. The method of claim 1, wherein the first location is a monitored building, and the event signal data is representative of a status of an alarm system associated with the monitored building.

6. The method of claim 1, wherein the first location is a monitored building and the second location is a central monitoring facility located geographically remote from the monitored building.

7. The method of claim 1, wherein the step of receiving event signal data comprises receiving data over a communications link selected from the list consisting of an analog telephone line, a digital telephone line, and a wireless connection.

8. The method of claim 1, wherein the step of recording the event signal data comprises recording data representative of at least one of debug data, time stamp data, and raw error code data.

9. The method of claim 1, further comprising adjusting a characteristic of the receiver based on the recorded event signal data.

10. The method of claim 1, further comprising modifying the predefined parameter or protocol, or generating an additional parameter or protocol for judging the acceptability of the event signal data, based on the recorded event signal data.

11. The method of claim 1, wherein the step of recording the event signal data comprises recording signal data at a plurality of locations within the receiver.

12. The method of claim 1, wherein the step of recording the event signal data comprises recording audio signals.

13. A system for identifying faulty event transmissions for use with a system comprising a plurality of alarms and an alarm panel associated with a monitored building, a receiver associated with a central monitoring facility, and a machine-readable storage medium encoded with a computer program code that, when executed by a processor, causes the processor to perform a method comprising:
    receiving event signal data from the alarm panel;
    processing the event signal data at the receiver;

recording the event signal data in memory associated with the receiver;

determining whether the event signal data conforms to a predefined parameter or protocol;

identifying the recorded event signal data as data to be overwritten if the event signal is recognized by the receiver; and identifying the recorded event signal data as data to be saved if the event signal is not recognized by the receiver.

14. The system of claim 13, wherein the method performed by the processor further comprises providing an indication that recorded event signal data is available for review.

15. The system of claim 14, wherein the indication comprises an alert to a system operator.

16. The system of claim 13, wherein the event signal data is representative of an alarm condition sensed by at least one sensor located within the monitored building.

17. The system of claim 13, wherein the event signal data is representative of a status of an alarm system associated with the monitored building.

18. The system of claim 13, wherein the monitored building and the central monitoring facility are connected via a communications link.

19. The system of claim 18, wherein the communications link selected from the list consisting of an analog telephone line, a digital telephone line, and a wireless connection.

20. The system of claim 13, wherein the event signal data comprises at least one of audio data, debug data, time stamp data, and raw error code data.

21. The system of claim 13, further comprising adjusting a characteristic of the receiver based on the recorded event signal data.

22. The system of claim 13, wherein the method performed by the processor further comprises modifying the predefined parameter or protocol, or generating an additional parameter or protocol for judging the acceptability of the event signal data based on the recorded event signal data.

23. The system of claim 13, wherein the step of recording the event signal data comprises recording signal data at a plurality of locations within the receiver.

24. The system of claim 13, wherein the step of recording the event signal data comprises recording audio signals.

25. A system for identifying faulty event transmissions for use with a system comprising a plurality of alarms and an alarm panel associated with a monitored building, a receiver associated with a central monitoring facility, and a machine-readable storage medium encoded with a computer program code that, when executed by a processor, causes the processor to perform a method comprising:

receiving event signal data from the alarm panel;

processing the event signal data at the receiver;

recording the event signal data in memory associated with the receiver;

identifying the recorded event signal data as data to be overwritten if the event signal is recognized by the receiver; and identifying the recorded event signal data as faulty if the event signal is not recognized by the receiver, and identifying the faulty event signal data as data to be saved.

* * * * *